United States Patent
Narayan-Sarathy et al.

(10) Patent No.: US 7,169,825 B2
(45) Date of Patent: Jan. 30, 2007

(54) DUAL CURE REACTION PRODUCTS OF SELF-PHOTOINITIATING MULTIFUNCTIONAL ACRYLATES WITH THIOLS AND SYNTHETIC METHODS

(75) Inventors: Sridevi Narayan-Sarathy, Hilliard, OH (US); Michael Gould, Powell, OH (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 156 days.

(21) Appl. No.: 10/628,373

(22) Filed: Jul. 29, 2003

(65) Prior Publication Data

US 2005/0027082 A1 Feb. 3, 2005

(51) Int. Cl.
*C08J 3/28* (2006.01)
*C08G 75/04* (2006.01)

(52) U.S. Cl. .......................... 522/13; 522/180; 522/148; 522/35; 522/173; 522/34; 528/306; 528/376; 528/26; 528/226

(58) Field of Classification Search ................ 522/13, 522/34, 35, 173, 180, 148; 528/26, 306, 528/376, 226

See application file for complete search history.

(56) References Cited

U.S. PATENT DOCUMENTS

| | | | | | |
|---|---|---|---|---|---|
| 4,272,586 | A | * | 6/1981 | Ando et al. | 428/419 |
| 4,409,376 | A | * | 10/1983 | Dowbenko et al. | 525/509 |
| 5,236,967 | A | * | 8/1993 | Ohkawa et al. | 522/32 |
| 5,496,896 | A | * | 3/1996 | Alfons | 525/74 |
| 5,876,805 | A | * | 3/1999 | Ostlie | 427/519 |
| 5,945,489 | A | * | 8/1999 | Moy et al. | 525/471 |
| 6,025,410 | A | * | 2/2000 | Moy et al. | 522/182 |
| 6,706,414 | B1 | * | 3/2004 | Dammann et al. | 428/524 |
| 7,041,749 | B2 | * | 5/2006 | Dammann et al. | 525/532 |

* cited by examiner

*Primary Examiner*—Susan Berman

(57) ABSTRACT

Self-photoinitiating liquid oligomeric compositions are disclosed. The oligomeric compositions are formed from multifunctional mercaptans and Michael addition polyacrylate resins, synthesized from multifunctional acrylates and β-dicarbonyl Michael donors, specifically β-keto esters, β-diketones, β-ketoamides or β-ketoanilides or combinations thereof. The oligomeric compositions are provided along with uses thereof and methods of fabricating.

53 Claims, No Drawings

DUAL CURE REACTION PRODUCTS OF SELF-PHOTOINITIATING MULTIFUNCTIONAL ACRYLATES WITH THIOLS AND SYNTHETIC METHODS

FIELD OF THE INVENTION

The present invention relates generally to self-photoinitiating resins. The invention relates specifically to multifunctional acrylate oligomers synthesized from multifunctional acrylates and β-keto esters, β-diketones, β-ketoamides or β-ketoanilides with multifunctional mercaptans.

BACKGROUND

The information provided below is not admitted to be prior art to the present invention, but is provided solely to assist the understanding of the reader.

Acrylate, methacrylate and other unsaturated monomers are widely used in coatings, adhesives, sealants, and elastomers, and may be crosslinked by ultraviolet light in the presence of photoinitiators or by peroxide-initiated free radical cure. These photoinitiators and/or peroxides are typically low molecular weight multifunctional compounds that may be volatile or readily absorbed through skin and can cause adverse health effects. Functionalized oligomeric photoinitiators may overcome some of these drawbacks; generally, polymeric photoinitiators are nonvolatile compounds, not readily absorbed through skin. However, multistep syntheses may be required, low functionality may be detrimental to reactivity and final properties, and catalyst or initiator may still be required to affect crosslinking.

The Michael addition of acetoacetate donor compounds to multiacrylate receptor compounds to make crosslinked polymers has been described in the literature. For example, Mozner and Rheinberger reported the Michael addition of acetoacetates to triacrylates and tetracrylates. (16 Macromolecular Rapid Communications 135 (1995)). The products formed were crosslinked gels. In one such reaction, depicted in FIG. 1, Mozner added one mole of trimethylol propane triacrylate (TMPTA) having 3 functional groups to one mole of polyethylene glycol (600 molecular weight) diacetoacetate (PEG600-DAA) having two functional groups. (Each acetoacetate "functional group" reacts twice, thus each mole of diacetoacetate has four reactive equivalents.)

Scheme 1

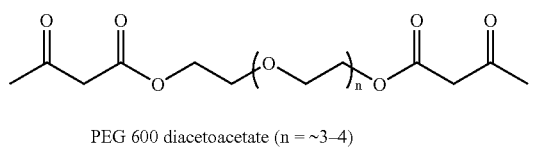

PEG 600 diacetoacetate (n = ~3–4)

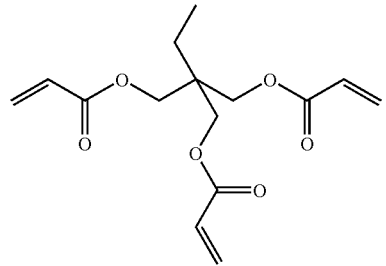

TMPTA

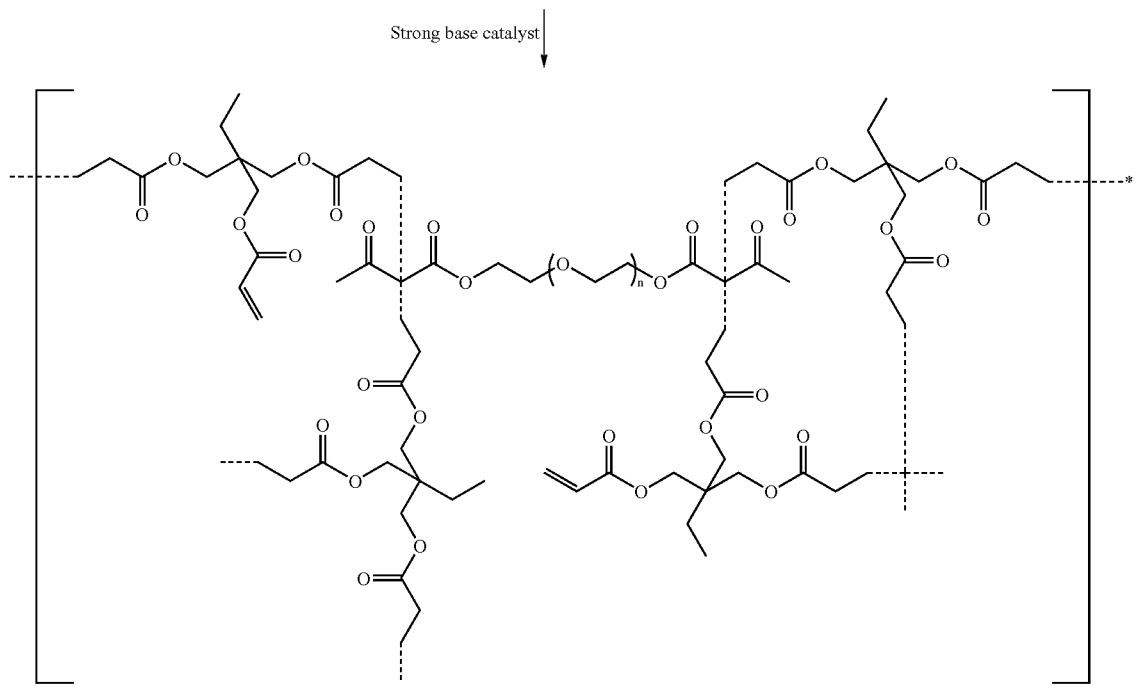

The resulting network is considered "gelled", or cured, despite the presence of unreacted acrylic functional groups. While further reaction can be promoted, this network cannot be made liquid either with heat or solvent because it is essentially crosslinked.

The reaction can be characterized by various ratios to describe the reactants: a mole ratio of TMPTA: PEG 600 DAA=1:1; a functional group ratio of the number of acrylate to acetoacetate functional groups=3:2, and a ratio of reactive equivalents=3:4

U.S. Pat. Nos. 5,945,489 and 6,025,410, to Moy et al. and assigned to the assignee of the present invention, disclose that certain soluble liquid uncrosslinked oligomers, made by one step Michael addition of β-dicarbonyl donor compounds (e.g., acetoacetates) to multiacrylates, can be further crosslinked using ultraviolet light without requiring costly photoinitiators. Moreover, when precise proportions of multiacrylate acceptor compounds to β-dicarbonyl donor compounds are combined in the presence of a basic catalyst, liquid oligomeric compositions result. If proportions below the ranges disclosed in the above-cited patent documents are used, crosslinked gels or solid products are made. In addition, the disclosed liquid oligomer compositions can readily be applied to various substrates using conventional coating techniques such as roll or spray prior to ultraviolet light cure.

SUMMARY OF INVENTION

We now disclose that the addition of suitable thiols to the above-disclosed polyacrylate resins leads to coatings having a much better surface cure with enhanced adhesion, mar resistance, and cure speed.

The present invention provides liquid oligomeric compositions, useful as a coating when further polymerized, comprising: a multifunctional mercaptan; and an organic soluble, ungelled, uncrosslinked, Michael addition reaction product, wherein the Michael addition product is formed from, but not limited to, a multifunctional acrylate Michael acceptor and a β-dicarbonyl Michael donor, specifically β-keto esters, β-diketones, β-ketoamides, or β-ketoanilides or combinations thereof.

The present invention provides liquid oligomeric compositions that are shelf stable for more than one month and have residual pendant unsaturated acrylate groups (in contrast to unsaturation in the oligomer "backbone" such as is obtained in the making of unsaturated polyester resins) and which photopolymerize exceptionally fast upon exposure to UV radiation.

The present invention provides liquid oligomeric compositions optionally further comprising at least one additive selected from the group consisting of pigments, gloss modifiers, flow and leveling agents and other additive as appropriate to formulate coatings, paints, laminates, sealants, adhesives, and inks. A good general reference is The Encyclopedia of Polymer Science and Engineering, $2^{nd}$ Edition, Wiley-Interscience Publications (1985).

The present invention provides a method of making liquid oligomeric compositions having residual pendant unsaturated acrylate groups, which comprises: providing a multifunctional acrylate Michael acceptor and a β-dicarbonyl Michael donor; reacting the donor and the acceptor using a base catalyst to form a Michael adduct; adding an acidifying agent to neutralize any residual basic species and admixing a multifunctional mercaptan.

The present invention provides a method of using a liquid oligomeric composition comprising: providing a multifunctional mercaptan, and an organic soluble, ungelled, uncrosslinked, Michael addition polyacrylate reaction product; applying the oligomeric composition to a surface; and curing the composition.

The present invention provides a method of using a liquid oligomeric composition wherein the composition further comprises at least one additive selected from the group consisting of pigments, gloss modifiers, flow and leveling agents and other additive as appropriate to formulate coatings, paints, laminates, sealants, adhesives, and inks.

An aspect of the present invention provides oligomeric compositions that may be further crosslinked to make coatings (e.g., paints, varnishes), inks, laminates, sealants, adhesives, elastomers and composite matrices.

The present invention provides a polymerized product comprising: a multifunctional mercaptan; and an organic soluble, ungelled, uncrosslinked, Michael addition polyacrylate reaction product, further crosslinked in the presence of a free-radical-generator.

DETAILED DESCRIPTION OF A PREFERRED EMBODIMENT

An aspect of the present invention provides a liquid oligomeric composition comprising a, controlled ratio mixture of a multifunctional mercaptan and an organic soluble, ungelled, uncrosslinked, Michael addition polyacrylate reaction product. The Michael addition polyacrylate product is formed from a multifunctional acrylate Michael acceptor and a β-dicarbonyl Michael donor. The β-dicarbonyl Michael donor is suitably chosen from among β-keto esters, β-diketones, β-ketoamides, and β-ketoanilides. The multifunctional acrylate Michael acceptor is suitably chosen from among diacrylates, triacrylates, and tetraacrylates. The range of β-dicarbonyl donors and multifunctional acrylate acceptors affords the composition designer the opportunity to exercise a great range of selectivity in the properties of the final product.

Preferred diacrylates include, but are not limited to: ethylene glycol diacrylate, propylene glycol diacrylate, diethylene glycol diacrylate, dipropylene glycol diacrylate, triethylene glycol diacrylate, tripropylene glycol diacrylate, tertraethylene glycol diacrylate, tetrapropylene glycol diacrylate, polyethylene glycol diacrylate, polypropylene glycol diacrylate, ethoxylated bisphenol A diacrylate, bisphenol A diglycidyl ether diacrylate, resorcinol diglycidyl ether diacrylate, 1,3-propanediol diacrylate, 1,4-butanediol diacrylate, 1,5-pentanediol diacrylate, 1,6-hexanediol diacrylate, neopentyl glycol diacrylate, cyclohexane dimethanol diacrylate, ethoxylated neopentyl glycol diacrylate, propoxylated neopentyl glycol diacrylate, ethoxylated cyclohexanedimethanol diacrylate, propoxylated cyclohexanedimethanol diacrylate, aryl urethane diacrylate, aliphatic urethane diacrylate, polyester diacrylate, and mixtures thereof.

Preferred triacrylates include, but are not limited to: trimethylol propane triacrylate, glycerol triacrylate, ethoxylated trimethylolpropane triacrylate, propoxylated trimethylolpropane triacrylate, tris(2-hydroxyethyl) isocyanurate triacrylate, ethoxylated glycerol triacrylate, propoxylated glycerol triacrylate, pentaerythritol triacrylate, aryl urethane triacrylates, aliphatic urethane triacrylates, melamine triacrylates, epoxy novolac triacrylates, aliphatic epoxy triacrylate, polyester triacrylate, and mixtures thereof.

Preferred tetraacrylates include, but are not limited to: pentaerythritol tetraacrylate, ethoxylated pentaerythritol tetraacrylate, propoxylated pentaerythritol tetraacrylate, dipentaerythritol tetraacrylate, ethoxylated dipentaerythritol tetraacrylate, propoxylated dipentaerythritol tetraacrylate, aryl urethane tetraacrylates, aliphatic urethane tetraacrylates, melamine tetraacrylates, epoxy novolac tetraacrylates, polyester tetraacrylates and mixtures thereof.

In a preferred embodiment, the β-dicarbonyl Michael donor is a β-diketone (e.g., 2,4-pentanedione). Suitably, the present invention may also be practiced with a β-ketoester (e.g., ethyl acetoacetate), a β-ketoanilide (e.g., acetoacetanilide) or a β-ketoamide (e.g., acetoacetamide) or a mixture of Michael donors according to the desired resin quality and end use; In preferred embodiments of the present invention, the β-dicarbonyl has functionality (N) wherein N=2. β-dicarbonyl donors of higher functionality (i.e., N=2, 4, 6 . . . ) are suitable, but more careful control of reaction stoichiometry must be exercised to avoid unwanted system, gellation.

Suitable β-dicarbonyl donor compounds having functionality=2 include, but are not limited to: ethyl acetoacetate, methyl acetoacetate, 2-ethylhexyl acetoacetate, lauryl acetoacetate, t-butyl acetoacetate, acetoacetanilide, N-alkyl acetoacetanilide, acetoacetamide, 2-acetoacetoxyethyl acrylate, 2-acetoacetoxyethyl methacrylate, allyl acetoacetate, benzyl acetoacetate, 2,4-pentanedione, 2,4-hexanedione, 3,5-heptanedione, isobutyl acetoacetate, and 2-methoxyethyl acetoacetate.

Suitable β-dicarbonyl donor compounds having functionality=4 include, but are not limited to: 1,4-butanediol diacetoacetate, 1,6-hexanediol diacetoacetate, neopentyl glycol diacetoacetate, cyclohexane dimethanol diacetoacetate, and ethoxylated bisphenol A diacetoacetate.

Suitable β-dicarbonyl donor compounds having functionality=6 include, but are not limited to: trimethylol propane triacetoacetate, glycerin triacetoacetate, and polycaprolactone triacetoacetates.

A preferred, but not limiting, β-dicarbonyl donor compound having functionality=8, is pentaerythritol tetraacetoacetate.

The Michael addition reaction is catalyzed by a strong base. A preferred base is diazabicycloundecene (DBU), which is sufficiently strong and is readily soluble in the monomer mixtures. Other cyclic amidines, for example diazabicyclononene (DBN) and guanidines, for example 1,1,3,3-tetramethyl guanidine, are also suitable for catalyzing this addition reaction. Group I alkoxide bases such as potassium tert-butoxide, provided they have sufficient solubility in the reaction medium, are typically adequate to promote the desired reaction. Quaternary hydroxides and alkoxides, such as tetrabutyl ammonium hydroxide or benzyltrimethyl ammonium methoxide, comprise another class of preferred base catalysts to promote the Michael addition reaction. Finally, strong, organophilic alkoxide bases can be generated in situ from the reaction between a halide anion (e.g., quaternary halide) and an epoxide moiety. Such in situ catalysts are disclosed in pending application Ser. No. 10/255,541 assigned to Ashland, Inc., the assignee of the present application.

Michael addition of a methacrylate-functional β-dicarbonyl compound, e.g., 2-acetoacetoxyethyl methacrylate (AAEM), to a diacrylate monomer yields liquid polyacrylates with reactive pendant methacrylate groups, which can be crosslinked in a subsequent curing reaction. As the acrylate and acetoacetate are mutually reactive and the methacrylate is essentially inert under the conditions of the desired Michael addition reaction, a highly functionalized (one methacrylate per repeat unit), liquid uncrosslinked oligomer can be obtained in a one-step, ambient temperature, solventless reaction.

The present invention confers an advantage in not requiring a solvent. However, the high selectivity of the Michael reaction permits the use of monomers such as styrene and methyl methacrylate as inert solvents to give low-viscosity systems that are easily incorporated into a variety of laminating resins. Suitable, non-limiting, non-reactive solvents include styrene, t-butyl styrene, a-methyl styrene, vinyl toluene, vinyl acetate, allyl acetate, allyl methacrylate, diallyl phthalate, $C_1$–$C_{18}$-methacrylate esters, dimethacrylates, and trimethacrylates.

The present invention provides a resin having residual pendant unsaturated acrylate groups. Residual pendant unsaturation means that polymerizable acrylic groups are retained by means of careful control of the reactant stoichiometry. That is, there are more acrylic groups than reactive sites on the Michael donor. The nature of that addition reaction leaves pendant (versus present as part of the "backbone" of the structure where it is attached on two sides) acrylic groups away from the site of the Michael addition. Those acrylic groups are available for free radical polymerization, further Michael addition crosslinking or "pseudo Michael addition" reactions, e.g., with amines, or thiol-ene additions with mercaptans after UV exposure.

The thiol-ene reaction can be promoted by catalytic amounts of bases or free radical generators. The free-radical generator may be peroxides, such as, but not limited to methyl ethyl ketone peroxide (MEKP), tert-butyl perbenzoate (TBPB), cumyl peroxide or t-butyl peroxide. Azo compounds comprise another class of free radical generators, for example, azobisisobutyronitrile (AIBN). A further advantage conferred by the present invention is that cure of the resin may be affected in the absence of added photoinitiator. However, where suitable, exogenous photoinitiator may be added to the inventive composition.

The thiol-ene reaction may be catalyzed by a base such as the base added to catalyze the Michael addition. Following the Michael reaction, it is preferred to react, and neutralize, the base by addition of an acidifying agent. Suitable acidifying agents include, but are not limited to, phosphoric acids, carboxylic acids, acid half esters, and inorganic acid-esters (e.g., hydroxyethyl methacrylate phosphate or hydroxyethyl acrylate phosphate). Preferably, the acidifying agent is added in an amount at least stoichiometric to the base. However, the acidifying agent may suitably be added in super-stoichiometric amounts.

In the following Examples all parts are by weight unless otherwise indicated.

An example of Michael polyacrylate resin (also termed Michael adduct or Michael addition product) synthesis is as follows. Trimethylolpropane triacrylate (TMPTA) 59.2 g and diazabicycloundecene (DBU) 0.4 g were weighed into a 500 ml 3-neck round bottom flask equipped with a mechanical stirrer and addition funnel. Ethyl acetoacetate (EAA) 13.0 g was weighed into the addition funnel. The TMPTA and DBU were mixed for 5 minutes prior to addition of the EAA. EAA was then added dropwise to the stirred TMPTA/DBU mixture over a 15-minute period. The solution warmed to 54 degrees Celsius after addition of EAA was complete. After the exotherm subsided in 100 minutes a viscous yellow liquid was obtained which did not gel upon standing.

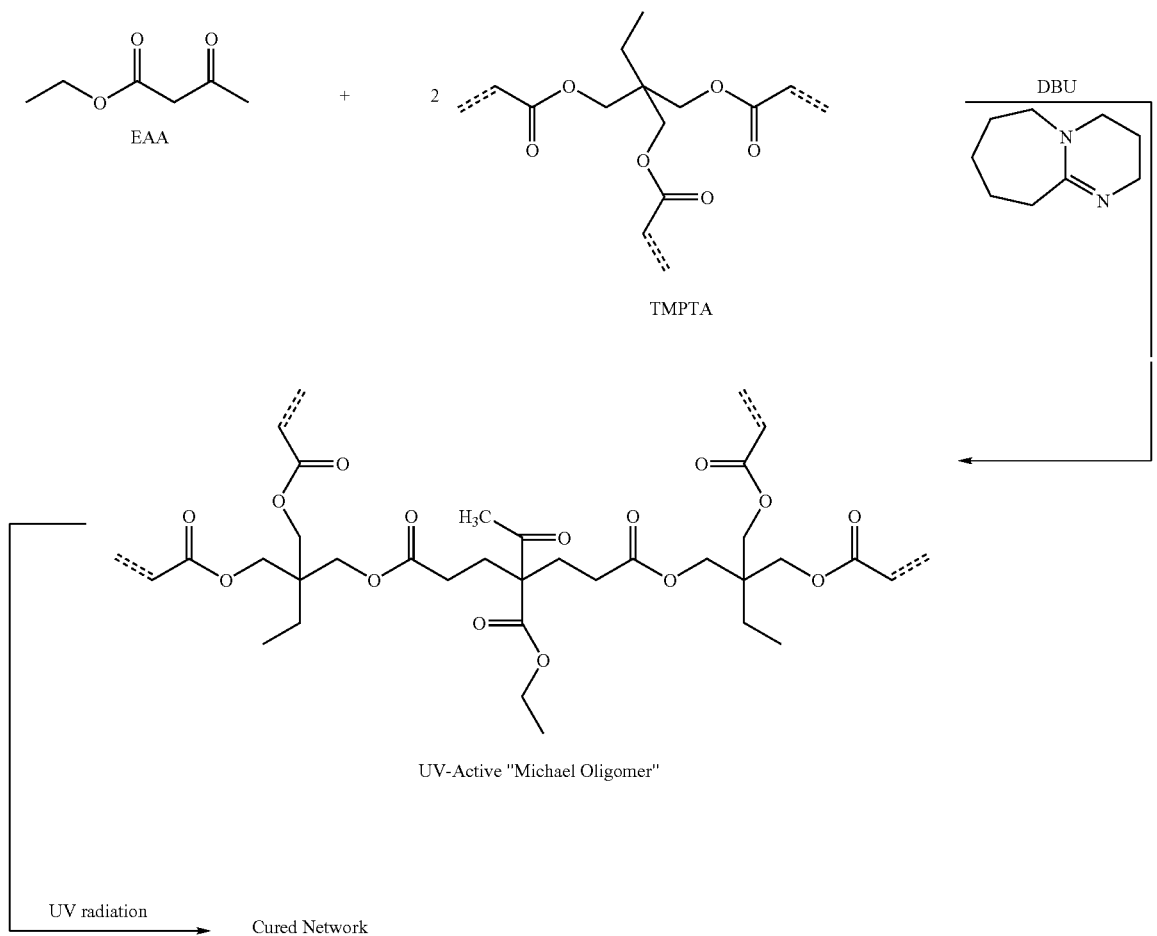

Scheme 2.
Novel UV-curable oligomer from the Michael Addition reaction of trimethylolpropane triacrylate (TMPTA) and ethyl acetoacetate (EAA).

The same general procedure can be employed for a variety of combinations of acrylate and β-dicarbonyl Michael donors, provided the equivalent ratio of acrylate: Michael donor is sufficient to yield liquid, uncrosslinked products. For particularly exothermic or large scale reactions, controlled, gradual addition of Michael donor and/or cooling of the reaction may be required to prevent premature, thermally initiated crosslinking of acrylate functional groups.

A multifunctional-mercaptan (R-SH, thiol, thioalcohol) is added to the Michael adduct after first neutralizing any residual base in the Michael addition resin. Numerous acidic agents are suitable to affect neutralization. In fact, no real penalty is accrued for utilizing acidic agents beyond the stoichiometric level of neutralization. Suitable acidic agents include phosphoric acid, poly phosphoric acid and/or hypophosphorous acid. More preferred-are organic agents such as carboxylic acids, acid half esters and inorganic acid esters (e.g., hydroxyethyl methacrylate phosphate or hydroxyethyl acrylate phosphate).

For the composition of the present invention to serve as a dual-cure system, able to undergo both free radical as well as thiol-ene reactions in the presence of actinic light, a multifunctional mercaptan is required with at least two thiol groups per mercaptan co-curative. The multifunctional mercaptan can be added in any equivalent ratio up to 1:1 because each mercaptan functional group is reactive with one acrylic double bond. Any residual acrylic double bonds are still available for free radical addition reactions. A preferred ratio is an equivalent ratio of 2–10:1 acrylate:mercaptan. A most preferred ratio is 4:1.

Di-functional-, trifunctional-, and poly-functional-thiols are suitable for purposes of the invention. A preferred thiol has structural characteristics including total functionality, molecular weight, linearity or branching, etc., consistent with the desired coating properties. Persons of skill in the coatings formulation arts are readily able to choose among various reactants so as to choose materials that will yield a product having the desired properties to satisfy a given end use. A thorough discussion is contained in Koleske, Radiation Curing of Coatings, ASTM Manual 45, 2002, the entire contents of which are hereby incorporated in their entirety and for all purposes.

A preferred di-functional mercaptan is ethylene glycol dimercaptopropionate. Suitable di-functional mercaptans include, but are not limited to, diethylene glycol dimercaptopropionate, 4-t-butyl-1,2-benzenedithiol, bis-(2-mercaptoethyl)sulfide, 4,4'-thiodibenzenethiol, benzenedithiol, glycol dimercaptoacetate, glycol dimercaptopropionate ethylene bis(3-mercaptopropionate), polyethylene glycol dimercaptoacetates, polyethylene glycol di(3-mercaptopropionates), 2,2-bis(mercaptomethyl)-1,3-propanedithiol, 2,5-dimercaptomethyl-1,4-dithiane, bisphenofluorene bis(ethoxy-3-mercaptopropionate), 4,8-bis(mercaptomethyl)-3,6,9-trithia-1,11-undecanedithiol, 2-mercaptomethyl-2-methyl-1,3-propanedithiol, 1,8-dimercapto-3,6-dioxaoctane, and thioglycerol bismercapto-acetate.

A preferred tri-functional mercaptan is trimethylol propane (tris-mercaptopropionate) (TMPTMP). Suitable tri-functional mercaptans include, but are not limited to, trimethylolpropane tris(3-mercaptopropionate), trimethylolpropane tris(3-mercaptoacetate), tris-(3-mercaptopropyl)isocyanurate, 1,2,3-trimercaptopropane, and tris(3-mercaptopropionate)triethyl-1,3,5-triazine-2,4,6-(1H,3H,5H)-trione.

A preferred polyfunctional mercaptan is poly (mercaptopropyl methyl) siloxane (PMPMS). Suitable polyfunctional mercaptans include, but are not limited to, 4-mercaptomethyl-3,6-dithia-1,8-octanedithiolpentaerythritol tetrakis(3-mercaptoacetate), and pentaerythritol tetrakis (3-mercaptopropionate).

Prior to affecting cure, the reactants can be mixed at any time to form a stable, homogeneous mixture provided there aren't basic species present (e.g., amines, alkoxides, phenoxides, etc.) that can catalyze thiol-ene crosslinking. Shelf stability, defined qualitatively by: 1) no premature gellation (i.e., cure) and 2) minimal increase in resin viscosity, can be achieved provided the system has been adequately "acidified" and the mixture kept free from exposure to actinic light. There is no established "benchmark" in this regard. The criterion of acceptability is defined by the end user.

The Michael adduct/mercaptan composition may be further stabilized against premature gelation by the addition of ppm levels of a polymerization inhibitor. A preferred polymerization inhibitor is (N-nitroso-N-phenylhydroxylamine)$_3$ Al (NPAL). A suitable concentration of NPAL is from about 500 ppm to about 2000 ppm. A preferred amount is 1000 ppm.

Dual-Cure Polymerization. An embodiment of the present invention provides Michael polyacrylate resins that yield cured, tack-free coatings on exposure to actinic light. The resins of the present invention cure by both free radical and thiol-ene reactions upon exposure to actinic light. The dual-cure polymerization of the present invention does not require the addition of an external photoinitiator.

Ultraviolet light photopolymerization was demonstrated by applying a portion of the inventive composition to a surface. The composition was spread over the surface to a thickness of about 1.5 mils. Specimens were cured with a Fusion Systems Corp. UV curing unit using a 600-watt H-bulb and a belt-speed of 40 feet/minute.

Application of the resins to a variety of substrates in the following examples was accomplished by the "draw down" technique to produce films of varying thickness, unless otherwise noted. Coatings were made using a draw-down bar on an aluminum or stainless steel panel. The coatings were cured by exposure to a single 600-W Fusion "H" bulb at the specified dose.

Coating performance properties are measured by a variety of different test methods familiar to persons of skill in the art. Hardness and chemical resistance were assessed on aluminum panels, adhesion was assessed on steel panels, and mar resistance measurements were performed on white painted aluminum panels.

Hardness. Film hardness is the ability of a coating to resist cutting, sheering, or penetration by a hard object. A method of measuring the coating's hardness is to scratch the film with pencil leads of known hardness. The result is reported as the hardest lead that will not scratch or cut through the film to the substrate. While this test is quite subjective, it does provide a quick and rather reliable method to determine film hardness. As measured by the pencil method: hard>hb; soft b-7b; very soft<7b. The method follows the procedure of ASTM D3363-00.

Solvent Resistance. Solvent resistance is the ability of a coating to resist solvent attack or film deformity. Rubbing the coating with a cloth saturated with an appropriate solvent is one way to assess when a specific level-of-solvent resistance is achieved. All rubbing tests were conducted using methyl ethyl ketone (MEK) and employed a double rub technique, one complete forward and backward motion over the coated surface. To normalize test strokes, cheesecloth was fixed to the round end of a 16-oz. ball peen hammer. The double rub technique utilizes the weight of the hammer as the operator holds the hammer at the base of the-handle. This test was performed until the double rubbing action cut into the film or a noticeable film disorder was evident. The method is modified from the procedure of ASTM D4752-95.

Mar resistance. Measured using an Atlas Crockmeter® and 0000 steel wool. The test method used is modified from ASTM D6279, using a white pigmented panel as a substrate and measuring 60° gloss before and after abrasion.

Adhesion to substrates was tested using phosphatized steel Q-panels®. (Q-panel® is a trademark of Q-Panel Lab Products, Cleveland, Ohio.). Adhesion testing was performed by the ASTM crosshatch method on rigid substrates. The ASTM test reports values from 0B to 5B, with 0B being a total failure, and 5B characterizing excellent adhesion.

EXAMPLE 1

Novel Michael addition polyacrylate resins based on Michael donors ethyl acetoacetate (FAA), 2,4-pentanedione (2,4-PD) and allyl acetoacetate (ALAA), were synthesized according to the method described in U.S. Pat. No. 5,945,489 and U.S. Pat. No. 6,025,410. The Michael polyacrylate resins were mixed with various mercaptans at different levels. The resin/thiol mixtures were then applied to aluminum and stainless steel substrates and cured "tack-free" at the specified dosage. As is known in the art, tack-free cure is a qualitative assessment of film surface cure that requires no stickiness or "greasiness" to the touch of an ungloved finger or palm and no tack with the finger of a latex glove. Results are collectively reported in Table I:

TABLE I

| # | Michael Addition Polyacrylate | Poly Functional Thiol | Wt. % Thiol | Viscosity (centipoise @ 25° C.) | Dose (mJ/cm$^2$) | Cross Hatch Adhesion | Solvent Resistance (MEK rubs) | Pencil Hardness | Mar Resistance (% 60° Gloss Retained)* |
|---|---|---|---|---|---|---|---|---|---|
| 1 | 0.85 HDDA/0.15 TMPTA/EAA 2.2 | — | — | 2571 | 1500 | 2B | >200 | b | 57.4 |
| 2 | 0.85 HDDA/0.15 TMPTA/EAA 2.2 | EGDMP | 10 | 1869 | 1000 | 5B | >200 | 2b | 88.3 |
| 3 | 0.85 HDDA/0.15 TMPTA/EAA 2.2 | TMPTMP | 7 | — | 1000 | 5B | >200 | — | 88.0 |
| 4 | 0.85 HDDA/0.15 TMPTA/EAA 2.2 | TMPTMP | 10 | 2450 | 1000 | 5B | >200 | f | 93.0 |
| 5 | 0.85 HDDA/0.15 TMPTA/EAA 2.2 | TMPTMP | 18 | — | 500 | 5B | >200 | — | 94.0 |
| 6 | 0.85 HDDA/0.15 TMPTA/EAA 2.2 | PMPMS | 10 | 2238 | 500 | 5B | >200 | f | 72.1 |
| 7 | 0.85 HDDA/0.15 TMPTA/2,4-PD 2.2 | — | — | 12,930 | 1000 | 5B | >200 | 2h | 91.7 |
| 8 | 0.85 HDDA/0.15 TMPTA/2,4-PD 2.2 | EGDMP | 10 | 6610 | 500 | 5B | >200 | 2h | 98.1 |
| 9 | 0.85 HDDA/0.15 TMPTA/2,4-PD 2.2 | TMPTMP | 10 | 9540 | 500 | 5B | >200 | 2h | 97.0 |
| 10 | 0.85 HDDA/0.15 TMPTA/2,4-PD 2.2 | PMPMS | 10 | 7780 | 500 | 5B | >200 | 5h | 94.0 |
| 11 | 0.75 HDDA/0.25 TMPTA/ALAA 2.2 | — | — | 6652 | 1500 | 5B | >200 | 2h | 58.4 |
| 12 | 0.75 HDDA/0.25 TMPTA/ALAA 2.2 | EGDMP | 10 | 3765 | 1000 | 5B | >200 | 2h | 86.4 |
| 13 | 0.75 HDDA/0.25 TMPTA/ALAA 2.2 | PMPMS | 10 | — | 500 | 4B | >200 | — | 100 |
| 14 | 0.75 HDDA/0.25 TMPTA/ALAA 2.2 | TMPTMP | 10 | — | 500 | 4B | >200 | — | 98.7 |

*Gloss measured on white panel at 60°.

In Experiments 1–6, the resin was an 85/15 molar blend of hexanediol diacrylate (HDDA) and trimethylolpropane triacrylate (TMPTA) reacted with ethyl acetoacetate in a 2.2:1 molar ratio and neutralized with Ebecryl 168 (hydroxyethyl methacrylate phosphate). In Experiments –10 the resin was an 85/15 molar blend of hexanediol diacrylate (HDDA) and trimethylolpropane triacrylate (TMPTA) reacted with 2,4-pentanedione (2,4-PD) in a 2.2:1 molar ratio and neutralized with Ebecryl 168 (hydroxyethyl methacrylate phosphate). Finally, in experiments 11–14, the resin was a 75/25 molar blend of hexanediol diacrylate (HDDA) and trimethylolpropane triacrylate (TMPTA) reacted with allyl acetoacetate (ALAA) in a 2.2:1 molar ratio and neutralized with Ebecryl 168). The thiol was variously trimethylol propane tris-mercaptopropionate (TMPTMP), poly (mercaptopropyl methyl) siloxane (PMPMS), or ethylene glycol dimercaptopropionate (EGDMP).

EXAMPLE 2

Table II

Novel Michael addition polyacrylate resins based on HDDA and TMPTA in the ratio 85:15 and ethyl acetoacetate was synthesized according to the method described in U.S. Pat. No. 5,945,489 and U.S. Pat. No. 6,025,410. This resin was mixed with 10% of either trimethylol propane (tris-mercaptoprpionate) (TMPTMP) or γ-mercaptopropyl tri-methoxy silane (MPTMS). The mixtures were then applied to an aluminum substrate and cured at different dosages to get a measure of the surface cure. Both tack-free (TF) and tack-free/smudge (TFS) cure responses were recorded. A coating given a TF grade is tack-free and multiple rubs with a cotton swab produce no marring. A coating given a TFS grade cures to a tack-free state, but is marred by multiple rubs with a dry cotton swab. The cure speed relates to the dosage of UV light required to achieve a tack-free coating and is stated below as defined by an International Light 393A "Light Bug" radiometer:

TABLE II

| Thiol | 10 fpm = 1,000 mJ/cm$^2$ | 20 fpm = 500 mJ/cm$^2$ | 30 fpm = 300 mJ/cm$^2$ | 40 fpm = 275 mJ/cm$^2$ | 50 fpm = 200 mJ/cm$^2$ |
|---|---|---|---|---|---|
| — | TF | TFS | — | tacky | wet |
| TMPTMP | TF | TF | — | TFS | — |
| MPTMS | TF | TFS | — | — | — |

EXAMPLE 3

Table III

Novel Michael addition polyacrylate resins based on various acrylates and Michael donors were synthesized according to the method described in U.S. Pat. No. 5,945, 489 and U.S. Pat. No. 6,025,410. Selected resins were mixed with various mercaptans as indicated. The resin products were then characterized by photocalorimetry (Photo DSC). Photocalorimetry provides a measure of heat evolution after a precise dose of UV radiation from a medium pressure mercury lamp. While it is essentially a bulk property measurement, it can be used to compare resins against one another from a relative heat-release perspective. In general, greater heat release with a standard UV exposure or "pulse" extrapolates to faster and more complete cure of a given resin system. By way of example, in Table III, heat evolved for each UV pulse is recorded. When a large heat release is followed by a much smaller one, more double bonds were reacted with the first pulse. Polyacrylate monomer and oligomer "standard" with conventional photoinitiators will typically evolve heat in a 50%, 30%, 20% pattern (e.g., Table III, "Stnd." Sample).

TABLE III

| Michael Addition # | Polyacrylate Sample | Sample size (mg) | ΔH J/g | | |
|---|---|---|---|---|---|
| | | | Pulse 1 | Pulse 2 | Pulse 3 |
| Stnd. | PEA + 5% Irgacure 651 | 20.0 | 122.3 | 70.33 | 39.5 |
| 1 | 85/15 HDDA/TMPTA/EAA | 1.7 | 101.4 | 24 | 9.7 |
| 2 | 85/15 HDDA/TMPTA/EAA + TMPTMP | 1.4 | 119.4 | 18 | 8.2 |

Uses for dual cure or "hybrid cure" coating systems are similar to those for standard coatings, i.e., for substrate protection and/or decoration. However, the utility of dual cure capability allows for the development of ultimate film properties with greater latitude than conventional coating technologies. For instance, full cure, as characterized by film hardness and solvent resistance, can be accomplished in seconds with as little as 500 mJ/cm2 of UV radiation (or less) compared to a 30-minute high temperature "bake" for an alkyd or melamine-based coating. Contrasting directly with conventional UV-based coatings, the Michael polyacrylate resin/thiol-ene dual cure system can develop "green strength" or "blocking resistance" with a miniscule UV pulse or with a tiny amount of amine catalyst or peroxide. Once having attained a first stage or initial degree of cure, the coating can then be manipulated by forming, printing, or laminating operations prior to affecting full cure. Once fully cured, many coatings are more difficult to bend or form and/or they don't adhere as well during forming operations. Thus, the capability of dual cure allows for manipulation of the substrate in ways that conventional systems, including conventional UV-cured coatings, cannot emulate.

Monoacrylates can be employed to moderate resin properties as needed. For instance, addition of up to 25 mol % of a monofunctional acrylate (e.g., isobornyl acrylate, IBOA) allows for "toughening" of a coating without increasing brittleness through greater crosslinking. Other monofunctional monomers, ethoxy ethoxy ethyl acrylate (EOEOEA) or dodecyl acrylate, may be added to moderate film adhesion to substrates with disparate surface energies or to enhance incorporation of pigments, nano particles, waxes or silicones into a coating formulation. Suitable monoacrylates include, but are not limited to, simple $C_1$–$C_{18}$ acrylate esters, isobornyl acrylate (IBOA), tetrahydrofurfuryl acrylate (THFFA), 2-(2-ethoxy ethoxy) ethyl acrylate (EOEOEA), phenoxyethyl acrylate (PEA), hydroxyalkyl acrylate, monoalkyl polyalkylene glycol acrylate, siloxane, silane or silicone acrylate, perfluoroalkyl acrylate caprolactone acrylate, and mixtures thereof.

INCORPORATION BY REFERENCE

All publications and patent applications cited in this specification are herein incorporated by reference, and for any and all purposes, as if each individual publication or patent application were specifically and individually indicated to be incorporated by reference. In the case of inconsistencies the present disclosure will prevail.

The invention claimed is:

1. A liquid oligomeric composition comprising:
   a multifunctional mercaptan;
   an acidifying agent; and
   an organic soluble, ungelled, uncrosslinked, Michael addition product said Michael addition product formed from:
   a multifunctional acrylate Michael acceptor and a β-dicarbonyl Michael donor.

2. The liquid oligomeric composition, according to claim 1, wherein said β-dicarbonyl Michael donor is selected from the group consisting of β-keto esters, β-diketones, β-ketoamides, β-ketoanilides, and mixtures thereof.

3. The liquid oligomeric composition, according to claim 2, wherein said β-dicarbonyl has equivalent functionality (N) wherein N=2,4,6, or 8.

4. The liquid oligomeric composition, according to claim 3, comprising a β-dicarbonyl donor compound having functionality=2 selected from the group consisting of: ethyl acetoacetate, methyl acetoacetate, 2-ethylhexyl acetoacetate, lauryl acetoacetate, t-butyl acetoacetate, acetoacetanilide, N-alkyl acetoacetanilide acetoacetamide, 2-acetoacetoxylethyl methacrylate, arlyl acetoacetate, benzyl acetoacetate, 2,4-pentanedione, 2,4-hexanedione, 3,5-heptanedione isobutyl acetoacetate, 2-methoxyethyl acetoacetate, and mixtures thereof.

5. The liquid oligomeric composition, according to claim 3, comprising a β-dicarbonyl donor compound having functionality=4 selected from the group consisting of: 1,4-butanediol diacetoacetate, 1,6-hexanediol diacetoacetate, neopentyl glycol diacetoacetate, cyclohexane dimethanol diacetoacetate, alkoxylated bisphenol A diacetoacetate, and mixtures thereof.

6. The liquid oligomeric composition, according to claim 3, comprising a β-dicarbonyl donor compound having functionality=6 selected from the group consisting of: trimethylol propane triacetoacetate, glycerin triacetoacetate, and polycaprolactone triacetoacetates, alkoxylated derivates thereof, and mixtures thereof.

7. The liquid oligomeric composition, according to claim 3, comprising a β-dicarbonyl donor compound having functionality=8 selected from the group consisting of pentaerythritol tetraacetoacetate and alkoxylated derivates thereof.

8. The liquid oligomeric composition, according to claim 1, wherein said multifunctional acrylate Michael acceptor is selected from the group consisting of diacrylates, triacrylates, and tetaacrylates.

9. The liquid oligomeric composition, according to claim 8, wherein a ratio of acceptor to donor functional groups is selected from the group consisting of ≧1:1 where said β-dicarbonyl functionality=2, ≧4.5:1 where said β-dicarbonyl functionality=6, and ≧3.5:1 where said β-dicarbonyl functionality=8.

10. The liquid oligomeric composition, according to claim 8, wherein a ratio of acceptor to donor functional groups is selected from the group consisting of ≧2.1 where said β-dicarbonyl functionality=2, ≧6.4:1 where said β-dicarbonyl functionality=4, ≧7.8:1 where said β-dicarbonyl functionality=6, and ≧7.4:1 where said β-dicarbonyl functionality=8.

11. The liquid oligomeric composition, according to claim 8, wherein a ratio of acceptor to donor functional groups is selected from the group consisting of ≧3.3 where said acetoacetate functionality=2, ≧12.3:1 where said β-dicarbonyl functionality=4, ≧13.2:1 where said β-dicarbonyl functionality=6, and ≧12.7:1 where said β-dicarbonyl functionality=8.

12. The liquid oligomeric composition, according to claim 8, comprising a diacrylate Michael acceptor selected from the group consisting of:
ethylene glycol diacrylate, propylene glycol diacrylate, diethylene glycol diacrylate, dipropylene glycol diacrylate, triethylene glycol diacrylate, tripropylene glycol diacrylate, tertraethylene glycol diacrylate, tetrapropylene glycol diacrylate, polyethylene glycol diacrylate, polypropylene glycol diacrylate, ethoxylated bisphenol A diacrylate,
bisphenol A diglycidyl ether diacrylate, resorcinol diglycidyl ether diacrylate, 1,3-propanediol diacrylate, 1,4-butanediol diacrylate, 1,5-pentanediol diacrylate, 1,6-hexanediol diacrylate, neopentyl glycol diacrylate, cyclohexane dimethanol diacrylate,
ethoxylated neopentyl glycol diacrylate, propoxylated neopentyl glycol diacrylate, ethoxylated cyclohexanedimethanol diacrylate, propoxylated cyclohexanedimethanol diacrylate, acrylated epoxy diacrylates, aryl urethane diacrylates, aliphatic urethane diacrylates, polyester diacrylates, and mixtures thereof.

13. The liquid oligomeric composition, according to claim 8, comprising a tricrylate Michael acceptor selected from the group consisting of: trimethylol propane triacrylate, glycerol triacrylate, ethoxylated trimethylolpropane triacrylate, propoxylated trimethylolpropane triacrylate, tris(2-hydroxyethyl) isocyanurate triacrylate, ethoxylated glycerol triacrylate, propoxylated glycerol triacrylate, pentaerythritol triacrylate, aryrl urethane triacrylates, aliphatic urethane triacrylates, melamine triacrylates, aliphatic epoxy triacrylates, epoxy novolac triacrylates, polyester triacrylates and mixtures thereof.

14. The liquid oligomeric composition, according to claim 8, comprising a tetraacrylate Michael acceptor selected from the group consisting of: pentaerythritol tetraacrylate, ethoxylated pentaerythritol tetraacrylate, propoxylated pentaerythritol tetraacrylate, dipentaerythritol tetraacrylate, ethoxylated dipentaerythritol tetraacrylate, propoxylated dipentaerythritol tetraacrylate, aryl urethane tetraacrylates, aliphatic urethane tetraacrylates, melamine tetraacrylates, epoxy novolac tetraacrylates, and mixtures thereof.

15. The liquid oligomeric composition, according to claim 1, wherein said β-dicarbonyl Michael donor is a β-diketone or a β-ketoester.

16. The liquid oligomeric composition, according to claim 1, wherein said mercaptan is a dimercaptan.

17. The liquid oligomeric composition, according to claim 16, wherein said dimercaptan is selected from the group consisting of
ethylene glycol dimercaptopropionate,
diethylene glycol dimercaptopropionate,
4-t-butyl-1,2-benzenedithiol,
bis-(2-mercaptoethyl)sulfide,
4,4'-thiodibenzenethiol,
benzenedithiol,
glycol dimercaptoacetate,
glycol dimercaptopropionate ethylene bis(3-mercaptopropionate),
polyethylene glycol dimercaptoacetates,
polyethylene glycol di(3-mercaptopropionates),
2,2-bis(mercaptomethyl)-1,3-propanedithiol,
2,5-dimercaptomethyl-1,4-dithiane,
bisphenofluorene bis(ethoxy-3-mercaptopropionate),
4,8-bis (mercaptomethyl)-3,6,9-trithia-1,11-undecanedithiol,
2-mercaptomethyl-2-methyl-1,3-propanedithiol,
1,8-dimercapto-3,6-dioxaoctane, and
thioglycerol bismercapto-acetate.

18. The liquid oligomeric composition, according to claim 16, wherein said di-functional mercaptan is ethylene glycol dimercaptopropionate.

19. The liquid oligomeric composition, according to claim 1, wherein said mercaptan is a trimercaptan.

20. The liquid oligomeric composition, according to claim 19, wherein said trimercaptan is selected from the group consisting of
trimethylol propane(tris-mercaptopropionate) (TMPTMP),
trimethyloipropane tris(3-mercaptopropionate),
trimethylolpropane tris(3-mercaptoacetate),
Tris-(3-mercaptopropyl) isocyanurate,1,2,3-trimercaptopropane,
dipentaerythrithiol,
1,2,4-trimercaptomethyl benzene, and
tris(3-mercaptopropionate)triethyl-1,3,5-triazine-2,4,6-(1H,3H,5H)-trione.

21. The liquid oligomeric composition, according to claim 19, wherein said tri-functional mercaptan is trimethylol propane (tris-mercaptopropionate) (TMPTMP).

22. The liquid oligomeric composition, according to claim 1, wherein said mercaptan is a polyfunctional mercaptan.

23. The liquid oligomeric composition, according to claim 22, wherein said polyfunctional mercaptan is selected from the group consisting of
Poly(mercaptopropyl methyl) siloxane (PMPMS),
4-mercaptomethyl-3,6-dithia-1,8-octanedithiolpentaerythritol tetrakis (3-mercaptoacetate), and
pentaerythritol tetrakis(3-mercapto-propionate).

24. The liquid oligomeric composition, according to claim 22, wherein said polyfunctional mercaptan is poly(mercaptopropyl methyl)siloxane (PMPMS).

25. The liquid oligomeric composition, according to claim 1, wherein said Michael addition reaction is carried out in the presence of a strong base.

26. The liquid oligomeric composition, according to claim 25, wherein said base is chosen from the group consisting of cyclic amidines, guanidines, group I alkoxides, quaternary hydroxides, quaternary alkoxides, and alkoxide bases generated in situ by reaction between a halide anion and an epoxy moiety.

27. The liquid oligomeric composition, according to claim 26, wherein said alkoxide is generated in-situ by reaction between a quaternary halide and an epoxide moiety.

28. The liquid oligomeric composition, according to claim 25, wherein said base is chosen from the group consisting of diazabicycloundecene (DBU), diazabicyclo-nonene (DBN), and 1,1,3,3-tetramethyl guanidine.

29. The liquid oligomeric composition, according to claim 1, wherein said Michael addition reaction occurs in the presence of at least one non-reactive solvent.

30. The liquid oligomeric composition, according to claim 29, wherein said non-reactive solvent is selected from the group consisting of styrene, t-butyl styrene, α-methyl styrene, vinyl toluene, vinyl acetate, allyl acetate, allyl methacrylate, diallyl phthalate, C1–C18-methacrylate esters, dimethacrylates, and trimethacrylates.

31. The liquid oligomeric composition, according to claim 1, wherein said composition is shelf stable for more than one month and has residual pendant unsaturated acrylate groups.

32. The Liquid oligomeric composition, according to claim 1, further comprising a stabilizing agent.

33. The liquid oligomeric composition, according to claim 32, wherein a preferred stabilizing agent comprises (N-nitroso-N-phenylhydroxylamine)$_3$Al.

34. The liquid oligomeric composition, according to claim 1, wherein said acidifying agent is chosen from a group consisting of phosphoric acids, carboxylic acids, acid half esters, and inorganic acid esters.

35. The liquid oligomeric composition, according to claim 34, wherein a preferred acidifying agent is selected from the group consisting of phosphate esters of 2-hydroxyethyl acrylate, 2-hydroxyethyl methacrylate, 2-hydroxypropyl acrylate, 2-hydroxypropyl methacrylate, 4-hydroxybutyl acrylate, and 4-hydroxybutyl methacrylate.

36. The liquid oligomeric composition, according to claim 1, further comprising a monoacrylate.

37. The liquid oligomeric composition, according to claim 36, wherein said monoacrylate is chosen from the group consisting of $C_1$–$C_{18}$ acrylate esters, isobornyl acrylate (IBOA), tetrahydrofurfuryl acrylate (THFFA), 2-(2ethoxy ethoxy)ethyl acrylate (EOEOEA), phenoxyethyl acrylate (PEA), hydroxyalkyl acrylate, monoalkyl polyalkylene glycol acrylate, siloxane, silane or silicone acrylate, perfluoroalkyl acrylate, caprolactone acrylate, and mixtures thereof.

38. The liquid oligomeric composition, according to claim 36, wherein said monoacrylate is present up to about 50 mol %.

39. The liquid oligomeric composition, according to claim 36, wherein said monoacrylate is present in amounts from greater than 0 to about 25 mol %.

40. The liquid oligonieric composition, according to claim 36, wherein said monoacrylate is present in amounts from greater than 0 up to about 12.5 mol %.

41. The liquid oligomeric composition, according to claim 1, further comprising a free-radical generator.

42. The liquid oligomeric composition, according to claim 41, wherein said free-radical generator comprises a peroxide.

43. The liquid oligomeric composition, according to claim 42, wherein said peroxide is selected from the group consisting of methyl ethyl ketone peroxide (MEKP), tert-butyl perbenzoate (TBPB), cumyl peroxide, and t-butyl peroxide.

44. A polymerized product obtained by crosslinking:
a liquid oligomeric composition comprising:
a multifunctional mercaptan;
an acidifying agent; and
an organic soluble, ungelled, uncrossliniked, Michael addition product said Michael addition product formed from:
multifunctional acrylate, Michael acceptor and a β-dicarbonyl Michael donor,
wherein said oligomeric composition is crosslinked in the presence of a free-radical generator.

45. The polymerized product, according to claim 44, wherein said free-radical generator is actinic light.

46. The polymerized product, according to claim 44, wherein said free-radical generator is a peroxide.

47. A method of making a liquid oligonieric composition, wherein said oligomeric composition has pendant unsaturated acrylate groups, the method comprising:
reacting a multifunctional acrylate Michael acceptor and a β-dicarbonyl Michael donor in the presence of a strong base to form a Michael adduct having pendant unsaturated acrylate groups;
adding an acidifying agent to said adduct in an amount at least stoichiometric with said base; and
admixing a multifunctional mercaptan.

48. A method of using a liquid oligomeric composition comprising:
providing a liquid oligomeric composition comprising:
a multifunctional mercaptan,
an acidifying agent, and
an organic soluble, ungelled, uncrosslinked, Michael addition reaction product said Michael Addition product formed a multifunctional acrylate Michael accepter and a β-dicarbonyl Michael donor;
applying said oligomeric composition to a surface; and
curing said composition in the total absence of exogenous photoinitiator.

49. A method of using a liquid oligomeric composition, according to claim 48, wherein curing comprises providing a free-radical generator.

50. A method of using a liquid oligomeric composition, according to claim 49, wherein said free-radical generator is actinic light.

51. A method of using a liquid oligomeric composition, according to claim 49, wherein curing comprises reacting said composition under base catalyzed conditions.

52. A method of using a liquid oligomeric composition, according to claim 49, wherein said composition further comprises at least one additive.

53. A method of using a liquid oligomeric composition, according to claim 52, wherein said additive is selected from the group consisting of pigments, gloss modifiers, flow and leveling agents and other additive as appropriate to formulate coatings, paints, laminates, sealants, adhesives and inks.

* * * * *